US005809681A

United States Patent [19]

Miyamoto et al.

[11] Patent Number: 5,809,681

[45] Date of Patent: Sep. 22, 1998

[54] HIGH-LUMINOUS-PATTERN DISPLAY APPARATUS

[75] Inventors: Shigeru Miyamoto, Kawasaki; Kunimitu Kobayashi, Yokohama, both of Japan

[73] Assignee: Shingo Kizai Kabushiki Kaisha, Kanagawa-ken, Japan

[21] Appl. No.: 345,965

[22] Filed: Nov. 28, 1994

[30] Foreign Application Priority Data

Apr. 12, 1994 [JP] Japan .................................... 6-108898

[51] Int. Cl.$^{6}$ ............................ G09F 13/16; G02B 27/10

[52] U.S. Cl. ............................ 40/582; 359/626; 359/619; 359/621

[58] Field of Search ............................... 40/582; 359/626, 359/619, 625, 621

[56] References Cited

U.S. PATENT DOCUMENTS 593,045 11/1897 Cummings .......................... 359/619 X 1,668,449 5/1928 Brackensey ............................... 40/582

FOREIGN PATENT DOCUMENTS 3138 of 1908 United Kingdom ..................... 40/582

*Primary Examiner*—Cassandra Davis

*Attorney, Agent, or Firm*—Jordan and Hamburg

[57] ABSTRACT

A high-luminous-pattern display apparatus includes a surface luminous plate which includes a transparent planar plate stood vertically to a horizontal direction. The transparent planar plate has a front surface and an opposite rear surface, the rear surface being a light incident surface on which direct sunlight and in-air diffused light falls. The surface luminous plate further includes a group of transparent planoconvex lenses arranged uniformly in columns and rows and integrally molded with the front surface of the transparent planar plate. The columns and rows of planoconvex lenses define a front surface of the surface luminous plate, and a planar display plate having a pattern is arranged at the front surface of the surface luminous plate.

1 Claim, 19 Drawing Sheets

HIGH-LUMINOUS-PATTERN DISPLAY APPARATUS

FIELD OF THE INVENTION

The present invention relates to a high-luminous-pattern display apparatus that can be used as a surface luminous element, for example, in traffic sign plates, signboards, optical guidance display apparatuses, sign plates related to railroads, display apparatuses related to harbors, billboards, and display units used in windows.

PRIOR ART

Conventionally, as an apparatus for displaying a pattern, for example, of a traffic sign plate, an unilluminated type pattern display apparatus and an internally illuminated type pattern display apparatus are used. In the unilluminated type pattern display apparatus, in the daytime, the displayed pattern is visualized by the scattered light emission or absorption due to the direct sunlight, diffused in-air light, and secondary scattered light from buildings, road surfaces, trees, and the like and, in the night, the displayed pattern is visualized by the scattered light from streetlights and buildings, the light from the headlights of vehicles, or the outdoor illumination.

In the internally illuminated type pattern display apparatus, in the daytime, the pattern is visualized in the same manner as in the above unilluminated type pattern display apparatus, and, in the night, the internal light is turned on to emit light from the displayed pattern to be visualized.

In FIGS. 27 and 28, an example is shown wherein such a conventional pattern display apparatus is applied to a traffic sign. FIG. 27 is a front view and FIG. 28 is a side view. This traffic sign has a sign base 51 and a white reflective sheet 52 on the sign base 51, and a pattern 50 that is formed by combining a transparent colored ink with an opaque colored ink or a colored reflective sheet with a colored unreflective sheet is applied on the white reflective sheet 52.

FIG. 29 is a view illustrating how the above traffic sign operates. In the daytime, the direct sunlight and diffused in-air light 53 and the secondary scattered light 54 act directly on the above pattern 50 and the pattern is visualized by the scattered light emission or the absorption by the pattern surface. In the night, the pattern is visualized by the reentrant reflected light by a headlight B of a vehicle.

FIG. 30 is a sectional side view showing the structure of a traffic sign with an internal light. A surface plate 58 made of a white diffusing plate is attached to the end opening of a housing 55 and a pattern is printed on the surface. In the housing 55, a fluorescent lamp 56 or an EL element plate 57 that emits light by electroluminescence is provided. In the night, light is emitted from the pattern by the internal light and the pattern is visualized. In the daytime, the pattern is visualized in the same way as that of the above unilluminated reflective sign.

However, in the above prior art, in the daytime, the visuality of the pattern of the sign plate is greatly affected by the in-air diffused light as well as the direct sunlight. The prior art has the defect that cloudy weather, rainy weather, dusk, or follow light or back light resulting from the position of the sun even at the time when it is fine weather changes more the illuminance on the sign pattern positioned vertically than the illuminance on the sign pattern positioned horizontally and makes the pattern difficult to be visualized.

SUMMARY OF THE INVENTION

An object of the present invention is to provide a high-luminous-pattern display apparatus wherein the pattern is distinguished and the visuality is improved.

According to one embodiment of the present invention, there is disclosed a high-luminous-pattern display apparatus, comprising a pattern display section stood vertically to a horizontal direction; openings spaced from each other and formed in said pattern display section; nearly semispherical planoconvex lenses each with the opposite surface section in contact with the opening, the nearly semispherical planoconvex lens having a light flux reflective layer on the planar section; high-luminous elements wherein each of said nearly semispherical planoconvex lenses is slanted at a prescribed angle with a horizontal plane to allow the in-air diffused light flux in the daytime to be collected in a horizontal direction to the opposite surface to the in-air diffused light flux incident surface of said nearly semispherical planoconvex lens; and a surface luminous body having a prescribed number of said high-luminous elements arranged uniformly in columns and rows. According to another embodiment, there is disclosed a high-luminous-pattern display apparatus, comprising a transparent planar plate stood vertically to a horizontal direction; a luminous plate of a glass having a group of transparent planoconvex lenses arranged uniformly in columns and rows and integrally molded with the surface opposite to the light incident surface of the direct sunlight and in-air diffused light of said transparent planar plate; and a planar display plate arranged in front of said surface luminous plate and containing a pattern. There is also disclosed the high-luminous-pattern display apparatus, wherein a sheetlike EL element plate that becomes luminous by applying a commercial power source or a power source of a solar cell is bonded to the planar section of said surface luminous plate except the transparent planoconvex lens section, or the high-luminous-pattern display apparatus, wherein the planar section of said surface luminous plate except the transparent planoconvex lens section is integrally molded with said planoconvex lenses as reflective prisms, so that the visuality at the night is improved. Further, if said surface luminous plates are combined and arranged in a plane, a uniformly and highly bright surface luminous plate having a size in conformity with the size of a pattern can be made.

Since the high-luminous-pattern display apparatus can make uniformly luminous highly brightly the pattern surface on the surface opposite to the incident light surface of the direct sunlight and diffused in-air light falling on the back surface of the pattern, even when the direct sunlight or in-air diffused light on the pattern surface is back light, there are effects that the figure can be distinguished and that high visibility can be obtained.

DESCRIPTION OF THE PREFERRED EMBODIMENTS

Figure 1:
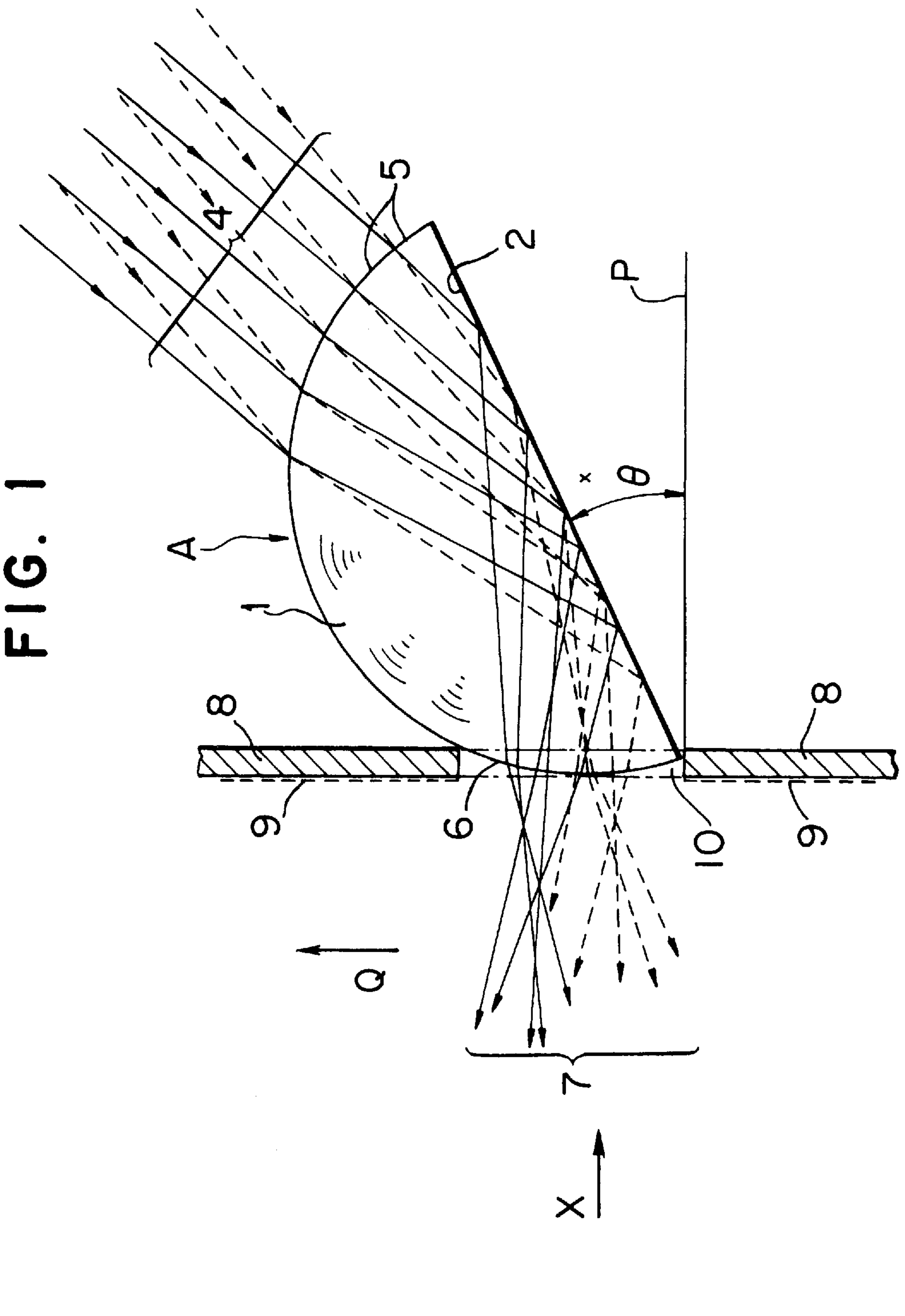
FIG. 1 is an explanatory view of the high-luminous element of a first embodiment according to the present invention.
Figure 2:
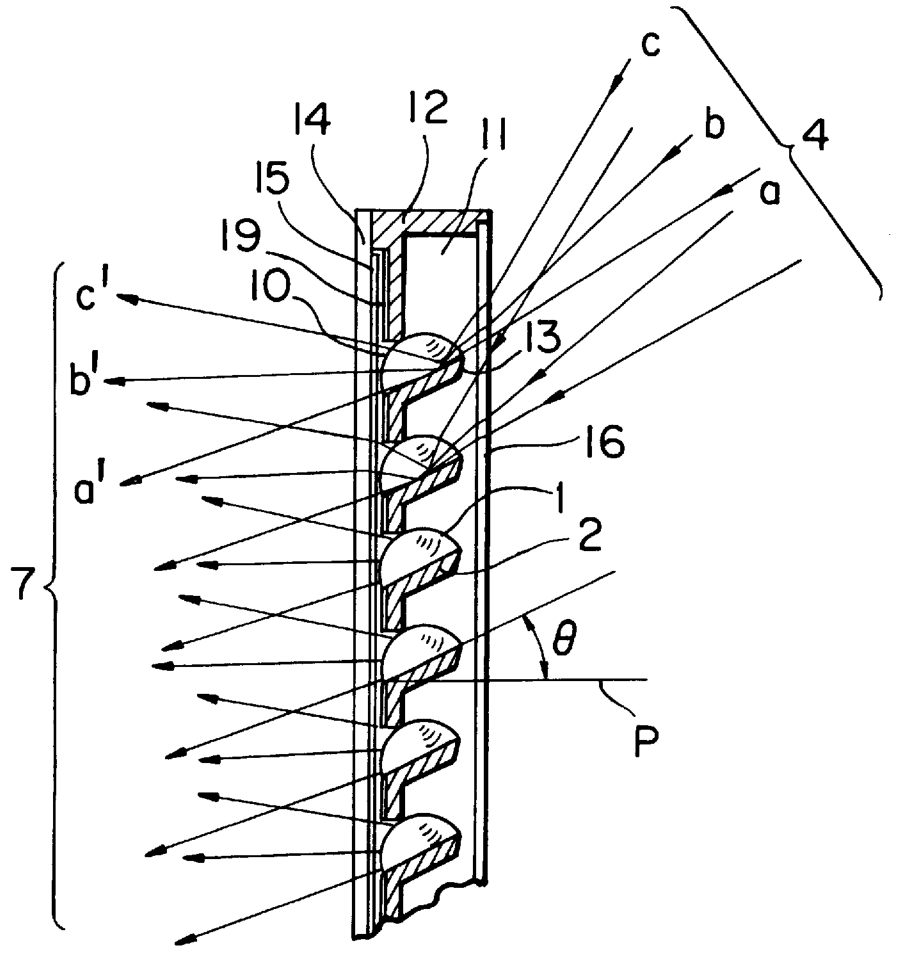
FIG. 2 is a sectional view, with parts broken away, showing an example of a case where the first embodiment according to the present invention is made into a surface luminous unit.
Figure 3:
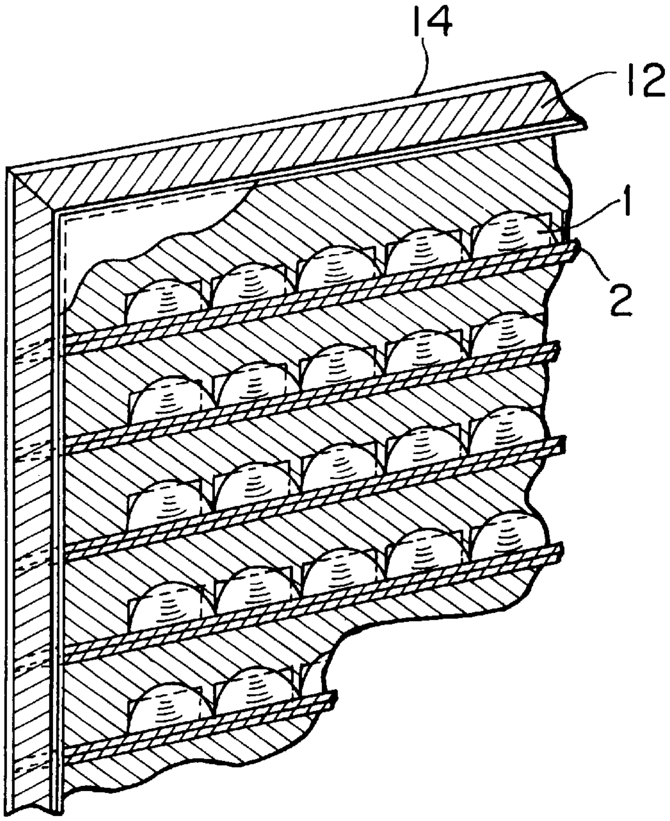
FIG. 3 is a rear perspective view of FIG. 2.
Figure 4:
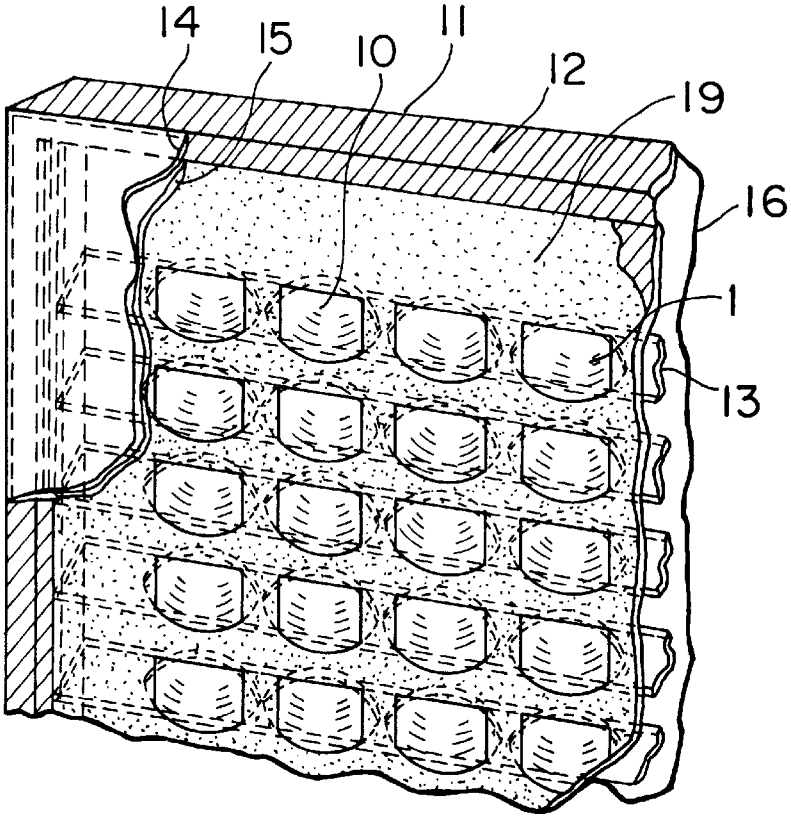
FIG. 4 is a front perspective view of FIG. 2.
Figure 5:
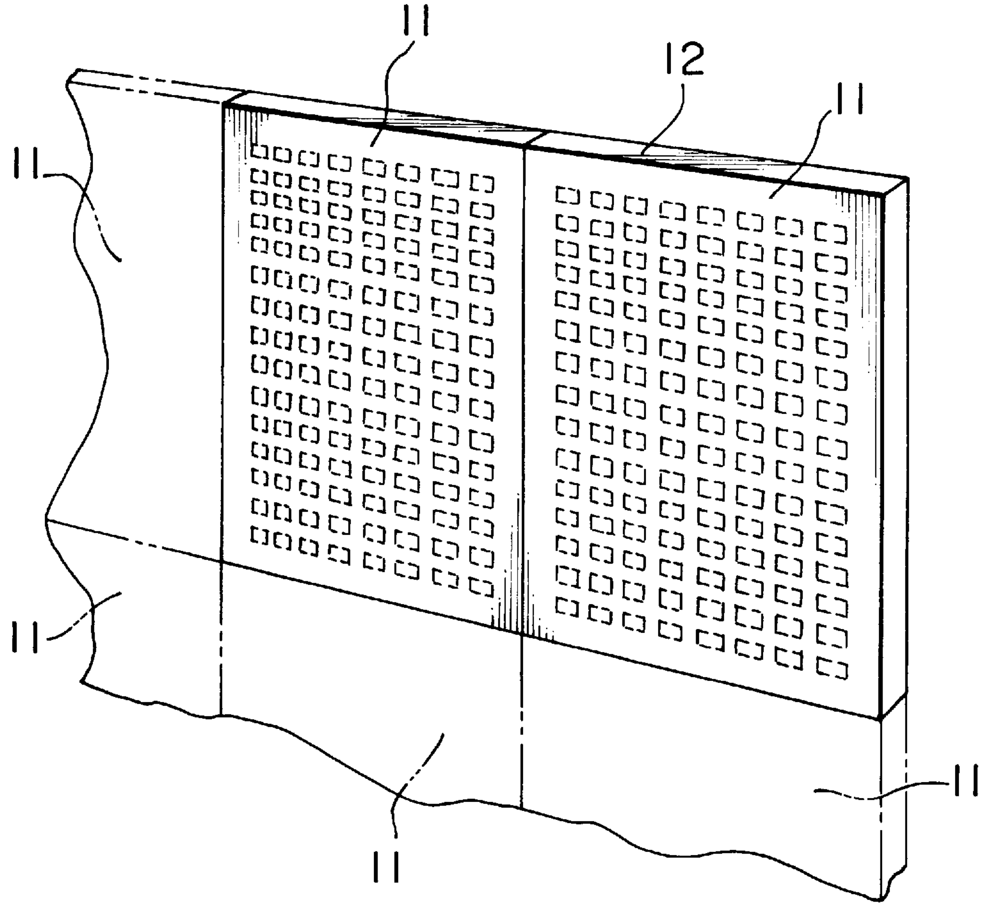
FIG. 5 is a perspective view, with parts broken away, showing an example of a case wherein a prescribed number of surface luminous units of the first embodiment according to the present invention are combined and arranged in a plane to form a large-sized luminous surface.
Figure 6:
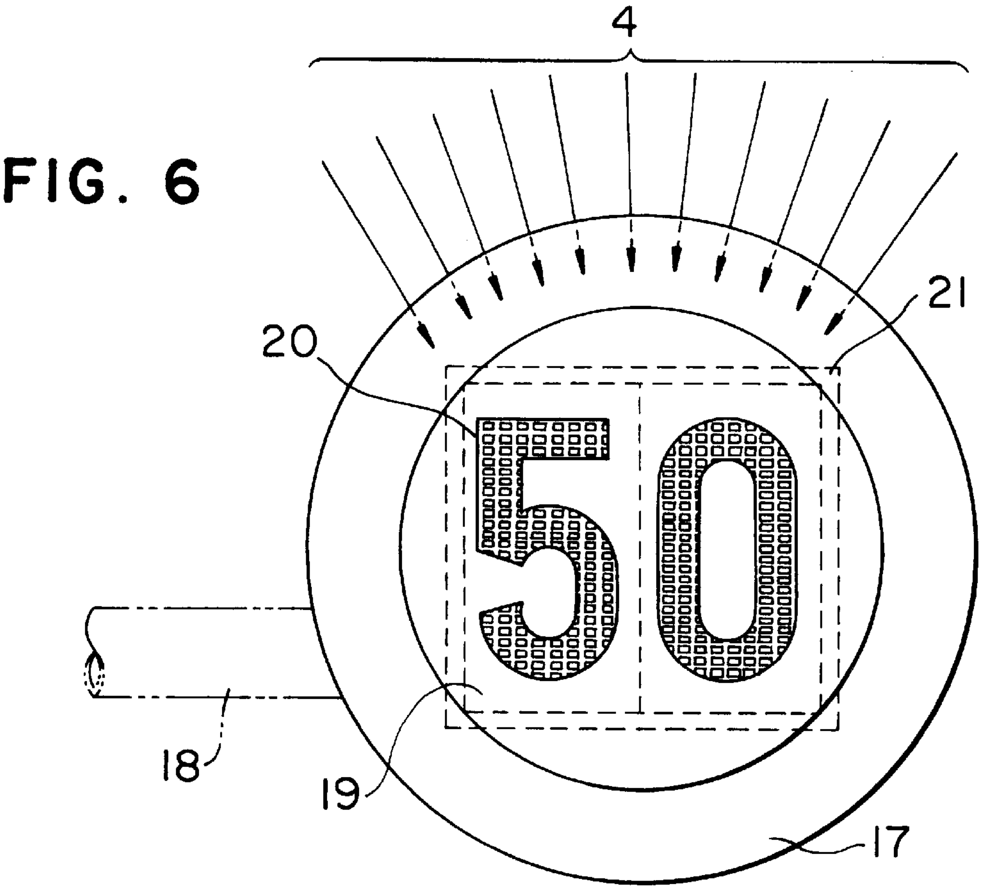
FIG. 6 is a front view of an example of a case wherein the surface luminous unit of the first embodiment according to the present invention is used in a sign plate.
Figure 7:
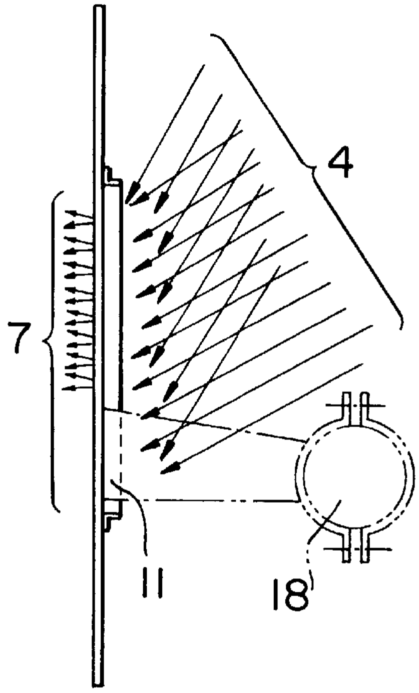
FIG. 7 is a right side view of FIG. 6.

Referring to FIGS. 1 to 7, a first embodiment of the present invention is described. FIG. 1 is an explanatory view of the high-luminous element of the present invention, FIG. 2 is a sectional view, with parts broken away, showing an example of a case wherein a surface luminous unit is made, FIG. 3 a rear perspective view of FIG. 2, FIG. 4 is a front perspective view of FIG. 2, FIG. 5 is a perspective view, with parts broken away, showing an example of a case wherein a prescribed number of surface luminous units are combined and arranged in a plane to form a large-sized luminous surface, FIG. 6 is a front view of an example of a case wherein a surface luminous unit is used in a sign plate, and FIG. 7 is a right side view of FIG. 6.

In FIG. 1, reference numeral 1 indicates a nearly semispherical planoconvex lens having a light flux reflective layer 2 on the plane surface. The nearly semispherical planoconvex lens is slanted at a prescribed angle θ with a horizontal plane P, so that a diffused in-air light flux 4 in the daytime is collected as a converged light 7 in a direction horizontal to an opposite surface 6 to a diffused in-air light flux incidence surface 5. This action of the nearly semispherical planoconvex lens 1 allows it to form a brightness luminous element A. A sign pattern plate 8 is placed in parallel with a vertical plane Q and is provided with the nearly semispherical planoconvex lens 1. A sign pattern surface 9 of the sign pattern plate 8 is formed with openings 10 and the nearly semispherical planoconvex lens 1 is fixed in the opening 10 with the opposite surface 6 engaged with the opening 10. The diffused in-air light flux 4 falling upon the diffused in-air light flux incidence surface 5 of the nearly semispherical planoconvex lens is collected to the opposite surface 6 to form the converged light 7. Thus the brightness at this part is elevated more than the in-air brightness.

Herein, the semispherical surface of the nearly semispherical convex lens 1 is not necessarily precisely semispherical. Also the light flux reflective layer 2 may be a simple reflective surface.

Referring to FIGS. 2 to 5, 11 indicates a surface luminous unit, 12 indicates a unit housing, 13 indicates a mount for the nearly semispherical planoconvex lens, 14 indicates a transparent front plate with a hue filter 15 that is attached to the front of the surface luminous unit 11, and 16 indicates a transparent back cover attached to the rear of the surface luminous unit 11, which has a waterproof structure.

Referring to FIG. 6, 17 indicates a sign plate, 18 indicates a sign plate attachment pole, 19 indicates a reflective-sheet material in which a sign pattern 20 is cut in, and 21 indicates a surface luminous unit attachment frame. In this embodiment, the nearly semispherical planoconvex lenses 1 are arranged uniformly in columns and rows, but they may be arranged in a row or in a column to form a linear surface luminous display.

Now the operation is described. As is shown in FIG. 2, the diffused in-air light flux 4 falling uniformly upon the diffused in-air light flux incidence surface 5 of each of the nearly semispherical planoconvex lenses 1 through the transparent back cover 16 is collected by the nearly semispherical planoconvex lens 1. The collected diffused in-air light flux 4 is sent forth as a converged light 7 from the opposite surface of the nearly semispherical planoconvex lens 1 and the opening 10. That is, a, b, and c of the diffused in-air light flux 4 are collected and sent forth in the directions of a', b', and c', which are arranged in a group on the side of the transparent front plate 14 and are uniform in luminous brightness to secure surface emitting light that has a luminous brightness quite higher than the in-air brightness and a wide distribution light visibility angle.

By sticking the reflective-sheet material 19 to the whole surface of the unit housing 12 except the opening 10, the reflection effect by light from the headlight of an automobile in the night can be obtained. The distribution light angle of the emitted light in the pattern visual direction at the planoconvex lens surface at the opening 10 obtained by the collecting action of the diffused in-air light flux 4 by the nearly semispherical planoconvex lens 1 is a result of a collecting action that is not obtained by the action of a mirror, a reflective plate, or a prism, and since it has a wide-angle plane of the visual angle that has a right and left visual angle of 50° or more with respect to the horizontal plane and a vertical plane visual angle of 40° or more and also the in-air diffused light is natural white light and therefore can be colored at will by passing it through the hue filter 15, the application to a sign pattern and a display is effectively made possible.

Figure 8:
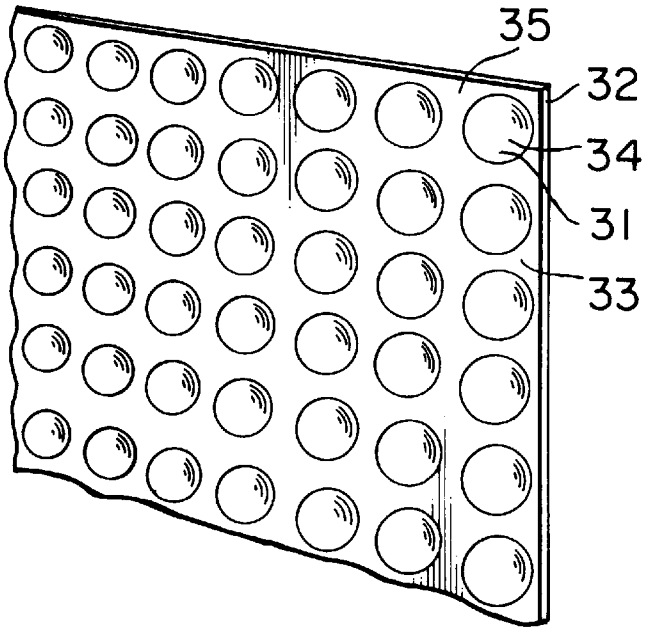
FIG. 8 is a perspective view of the surface luminous plate of a second embodiment according to the present invention.
Figure 9:
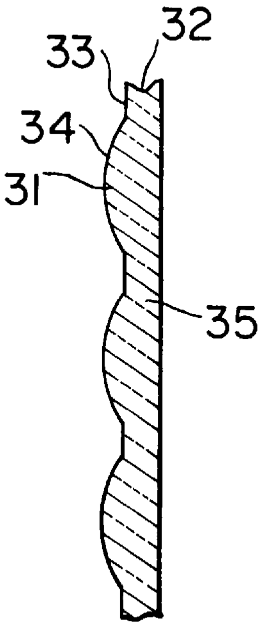
FIG. 9 is a sectional side view of FIG. 8.
Figure 10:
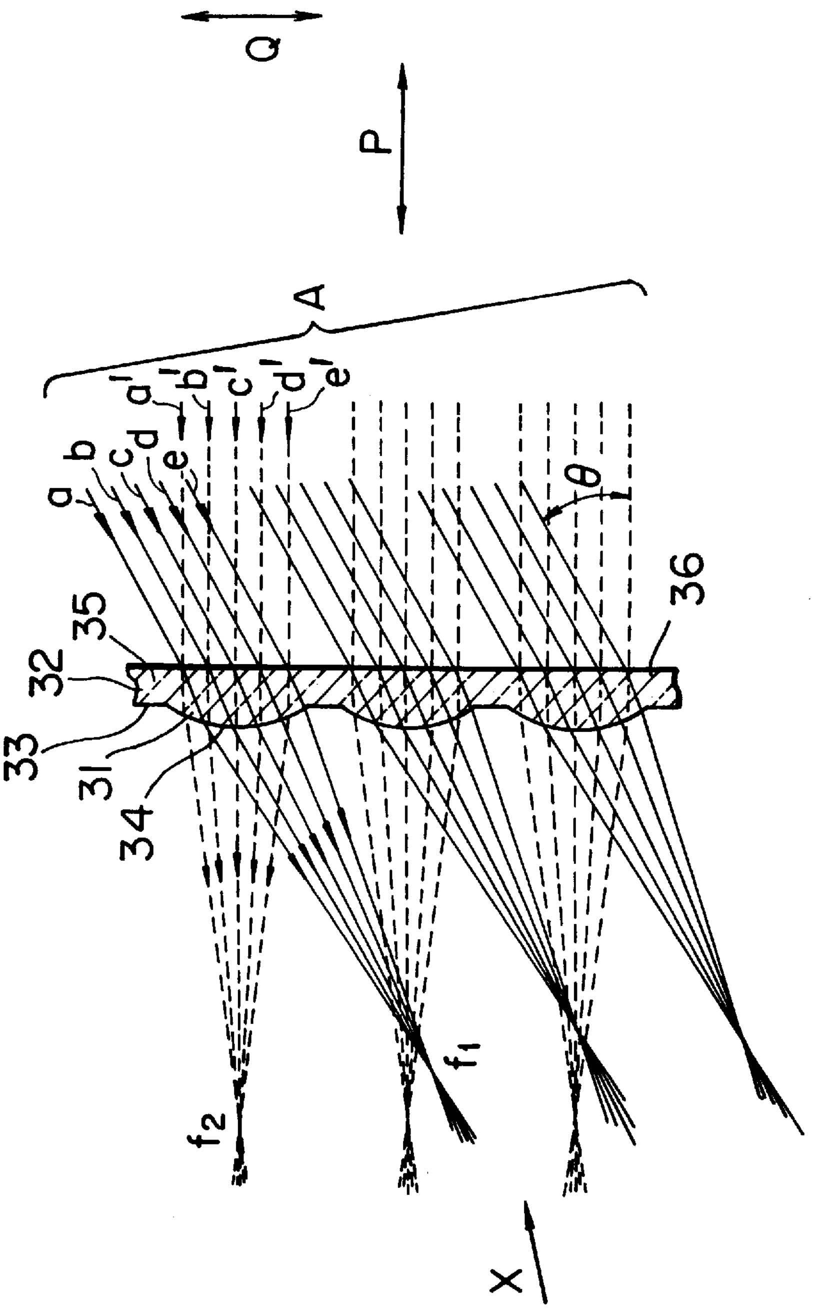
FIG. 10 is a view illustrating the action of collecting light fluxes by the surface luminous plate of the second embodiment according to the present invention.

Referring to FIGS. 8 to 10, a second embodiment of the present invention is described. FIG. 8 is a perspective view of a surface luminous plate that is a component of the high-luminous-pattern display apparatus of the present invention, and FIG. 9 is a sectional side view of the surface luminous plate of FIG. 8, which surface luminous plate 35 is formed by arranging a group of transparent planoconvex lenses 31 in columns and rows uniformly and integrally molding them with one surface of a transparent planar plate 32 of a transparent glass or transparent synthetic resin, that is, with a planar plate surface 33 opposite to the incident light surface of the direct sunlight and in-air diffused light. FIG. 10 shows the action of light flux collection by the surface luminous plate 35. The direct sunlight and in-air diffused light A falling on the whole of the back surface 36 of the surface luminous plate strikes like incident light fluxes a, b, c, d, and e from the air in a vertical plane Q to incident light fluxes a',b',c',d', and e' along a horizontal plane P that is the ground surface, the incident light fluxes a', b', c', d', and e' converge to a focus $f_2$ of the planoconvex lens 31 and the incident light fluxes a, b, c, d, and e converge to a focus $f_1$ of the planoconvex lens 31.

The present invention does not use simply the basic optical light flux action of the planoconvex lens 31 but uses the brightness increasing action of the surface 34 of the planoconvex lens 31 by the convergence. That is, as is shown in FIG. 10, since all of the in-air diffused light A is uniformly incident on all of the planoconvex lenses 31, the surface 34 where the planoconvex lenses 31 are arranged in a group emits light highly brightly throughout it uniformly.

Since the planoconvex lenses 31 formed in the surface luminous plate 35 of the present invention are symmetrical in relation to the planar plate surface 33, even if the incident light fluxes a, b, c, d, and e from the side of the vertical plane Q have an inclination θ, the highly bright light emission of the surface 34 of the planoconvex lens 31 is complete and all the direct sunlight and in-air diffused light A from the back surface of the surface luminous plate 35 can be utilized effectively. Here, the in-air diffused light A is diffused light and has no particular direction, but since the direct sunlight is directional due to the position of the sun, the direct sunlight and in-air diffused light A are shown with an inclination θ. Since the planoconvex lens 31 is symmetry with respect to plane when the light emission from the visual direction X is seen, the light can be emitted with the angle thereof being wide and the effectiveness of the pattern luminescence becomes high.

Figure 11:
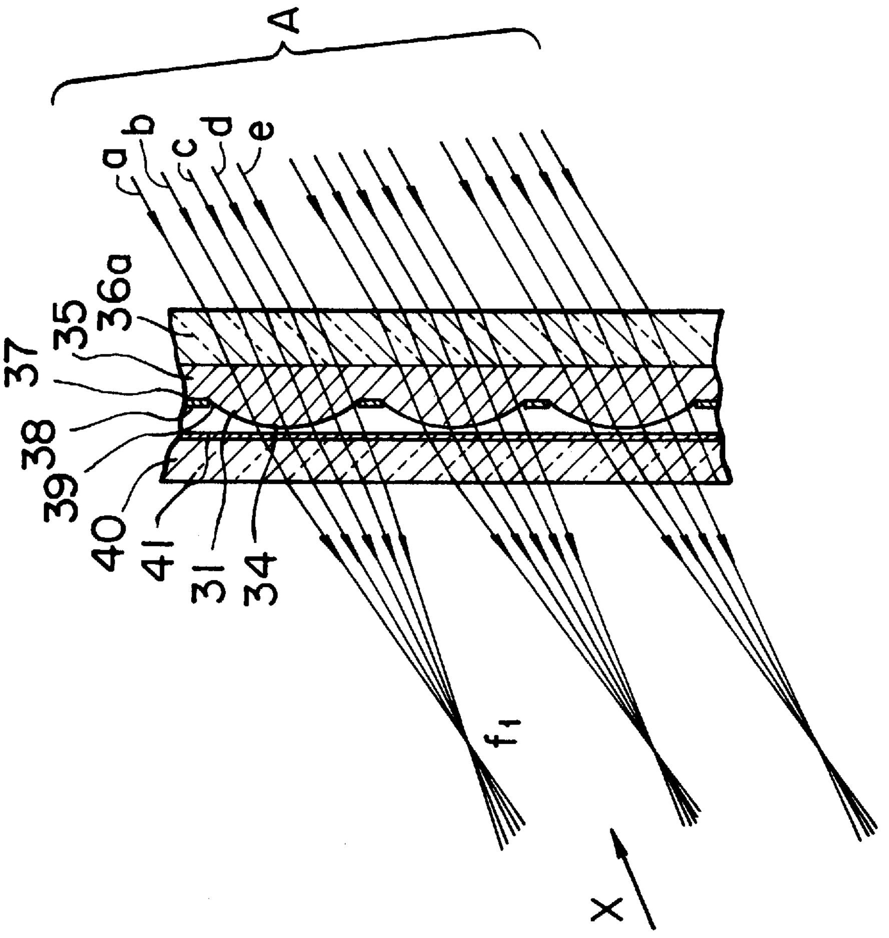
FIG. 11 is a sectional side view showing the constitution of a third embodiment according to the present invention.
Figure 12:
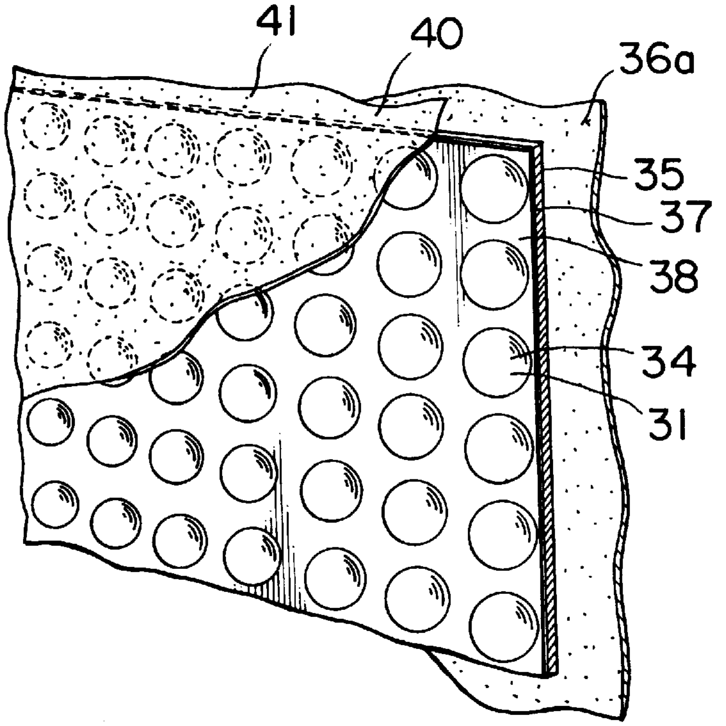
FIG. 12 is a perspective view, with parts broken away, showing the constitution of the third embodiment according to the present invention.

Referring to FIGS. 11 and 12, a third embodiment of the present invention is described. FIG. 11 is a sectional view of the high-luminous-pattern display apparatus and FIG. 12 is a perspective view of that high-luminous-pattern display apparatus with parts broken away. A surface luminous plate 35 is bonded to the front of a transparent planar plate 36*a* that is at the back of the surface luminous plate 35. To the front of the surface luminous plate 35 is opposed a transparent surface plate 40 of a glass, synthetic resin, or the like whose inner surface has a colored transparent pattern 41 made of a transparent colored ink or a transparent colored synthetic film. Since they are thus constructed, the arranged density of planoconvex lenses 31 arranged in a group permits the pattern 41 to make luminous uniformly.

Incident light fluxes a, b, c, d, and e of the direct sunlight and in-air diffused light pass through the transparent planar plate 36*a* and are led to the surface luminous plate 35 and the surface 34 of the planoconvex lens 31 collects and emits them highly brightly. They are allowed to pass the transparent surface plate 40 having the colored transparent pattern 41 and are brought outside of the focus $f_1$ of the planoconvex lens 31.

Figure 13:
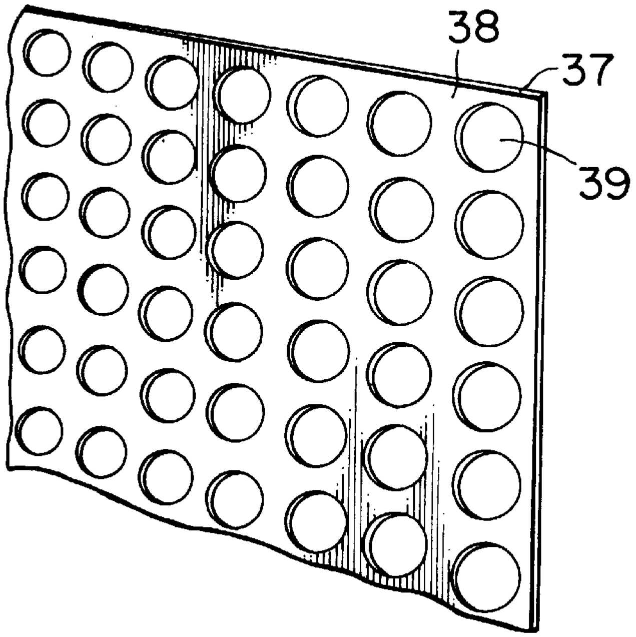
FIG. 13 is a perspective view of the high-luminous reentrant-reflective-sheet plate of the fourth embodiment according to the present invention.
Figure 14:
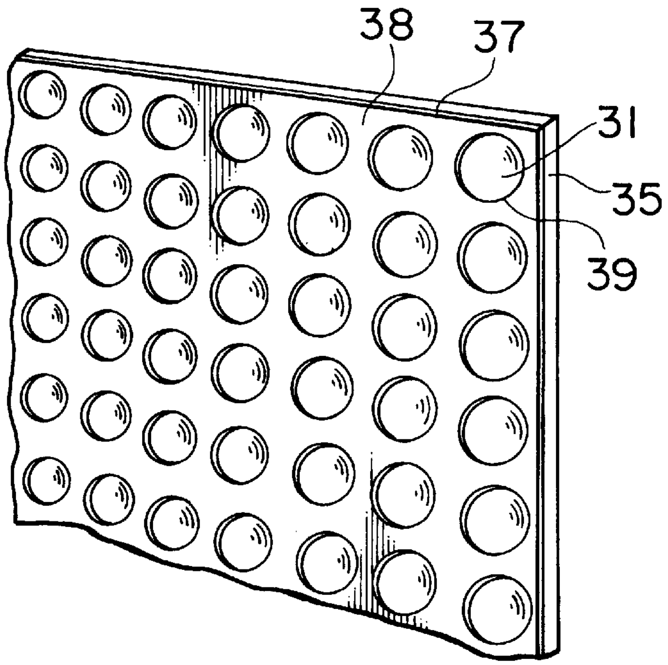
FIG. 14 is a perspective view showing a combination of the surface luminous plate and the high-luminous reentrant-reflective-sheet plate of the fourth embodiment according to the present invention.
Figure 15:
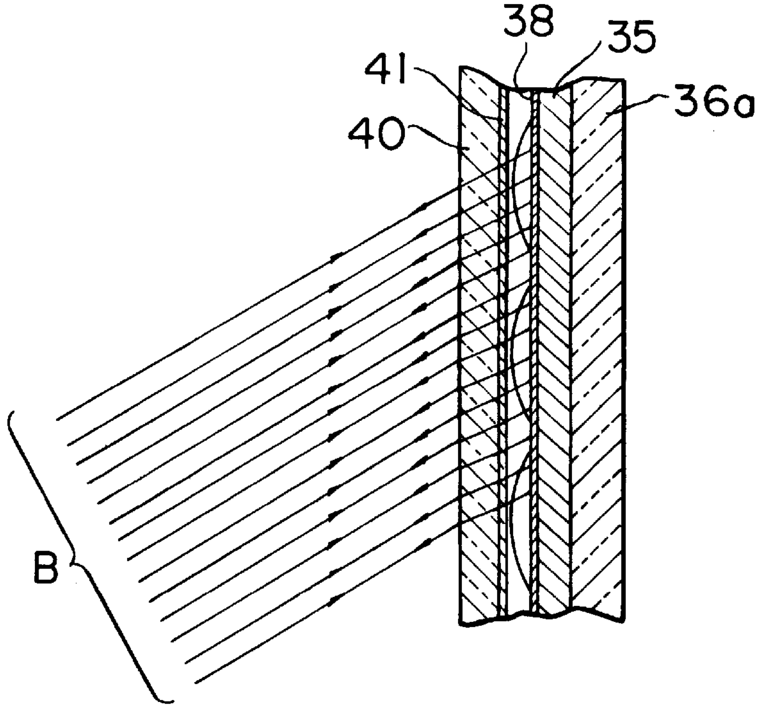
FIG. 15 is a view illustrating the action of the fourth embodiment according to the present invention.

Referring to FIGS. 13 to 15, a fourth embodiment of the present invention is described. When there is no direct sunlight and in-air diffused light A in the night, reentrant reflection or self-generated light of the colored transparent pattern 41 is required. For this end, a high-luminous reentrant-reflective sheet 38 is bonded to the planar part of the surface luminous plate 35 where the planoconvex lenses 31 are not present. The high-luminous reentrant-reflective sheet 38 is stuck to a reflective-sheet attachment plate 37 made of a planar plate. As is shown in FIG. 13, the reflective-sheet attachment plate 37 is formed with a plurality of holes 39 in which a plurality of planoconvex lenses 31 will be fitted. By fitting a plurality of planoconvex lenses 31 into the holes 39, a surface luminous plate 35 having the plurality of planoconvex lenses 31 and the high-luminous reentrant-refractive sheet 38 can be bonded.

FIG. 14 is a perspective view of the high-luminous reentrant-reflective sheet 38 and the surface luminous plate 35 that are bonded together. FIG. 15 shows a state wherein light B from a headlight is struck on the high-luminous-pattern display apparatus of this embodiment and is reflected back uniformly.

Figure 16:
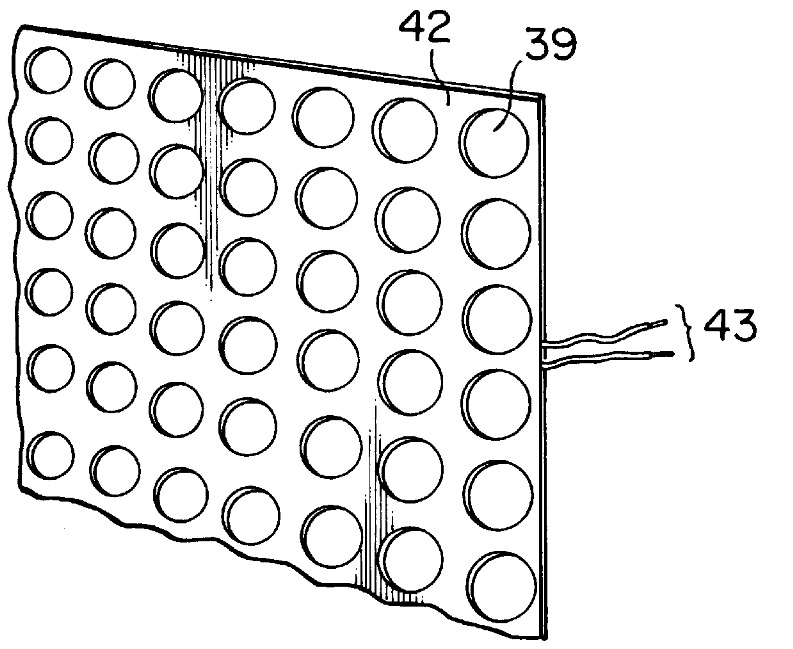
FIG. 16 is a perspective view of the EL element plate of a fifth embodiment according to the present invention.
Figure 17:
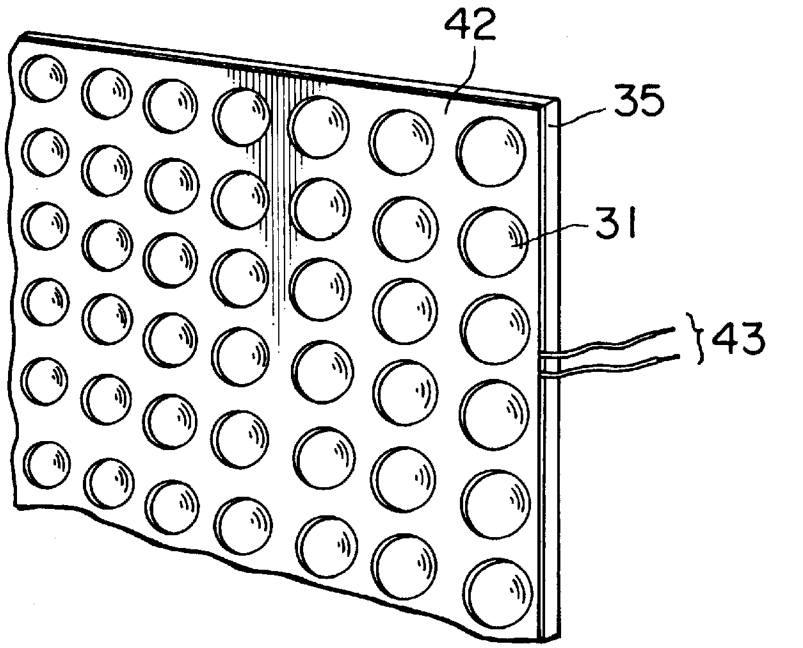
FIG. 17 is a perspective view showing a combination of the surface luminous plate and the EL element plate of the fifth embodiment according to the present invention.
Figure 18:
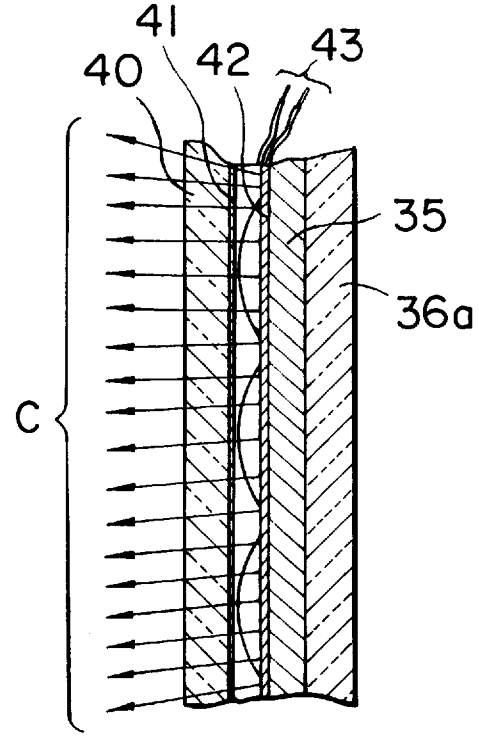
FIG. 18 is a view illustrating the action of the fifth embodiment according to the present invention.

Referring to FIGS. 16 to 18, a fifth embodiment of the present invention is described. In this embodiment, to cause reentrant reflection to be self-luminous, a sheetlike EL element plate that becomes electroluminous by applying a commercial power source or a power source of a solar cell is applied. As shown in FIG. 16, a plurality of holes 39 in which a plurality of planoconvex lenses 31 will be fitted in the same way as in the above are formed in this sheetlike EL element 42. As is shown in FIG. 17, a plurality of planoconvex lenses 31 are fitted in the holes 39, and the sheetlike EL element plate 42 and the surface luminous plate 35 having the plurality of planoconvex lenses 31 are bonded. The surface of this sheetlike EL element plate 42 can be made self-luminous uniformly. As is shown in FIG. 18, by the sheetlike EL element plate 42, a uniform luminous surface as a light flux C can be obtained.

Figure 19:
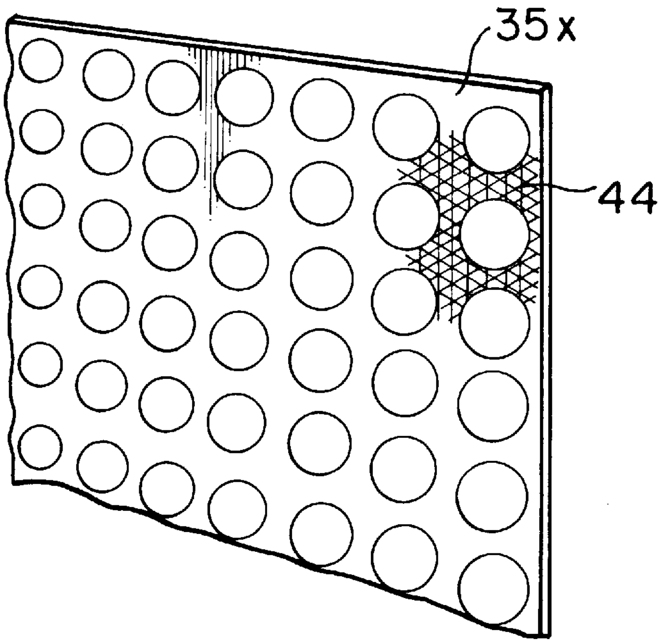
FIG. 19 is a perspective view of the surface luminous plate of a sixth embodiment according to the present invention.
Figure 20:
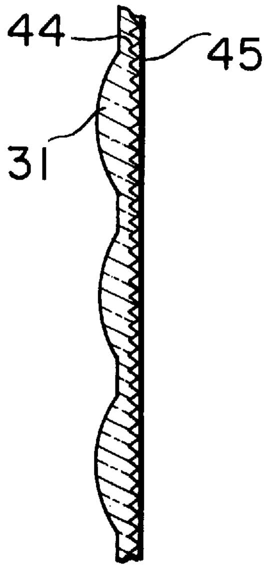
FIG. 20 is a sectional side view of FIG. 19.

Referring to FIGS. 19 and 20, a sixth embodiment of the present invention is described. As is shown in FIGS. 19 and 20, reflective prisms 44 are integrally molded with the back surface of a surface luminous plate 35 where transparent planoconvex lenses 31 are not present and the reflective prisms 44 form a white reflective synthetic resin layer 45, so that a surface luminous plate 35*x* with the reflective prisms can be made.

Figure 21:
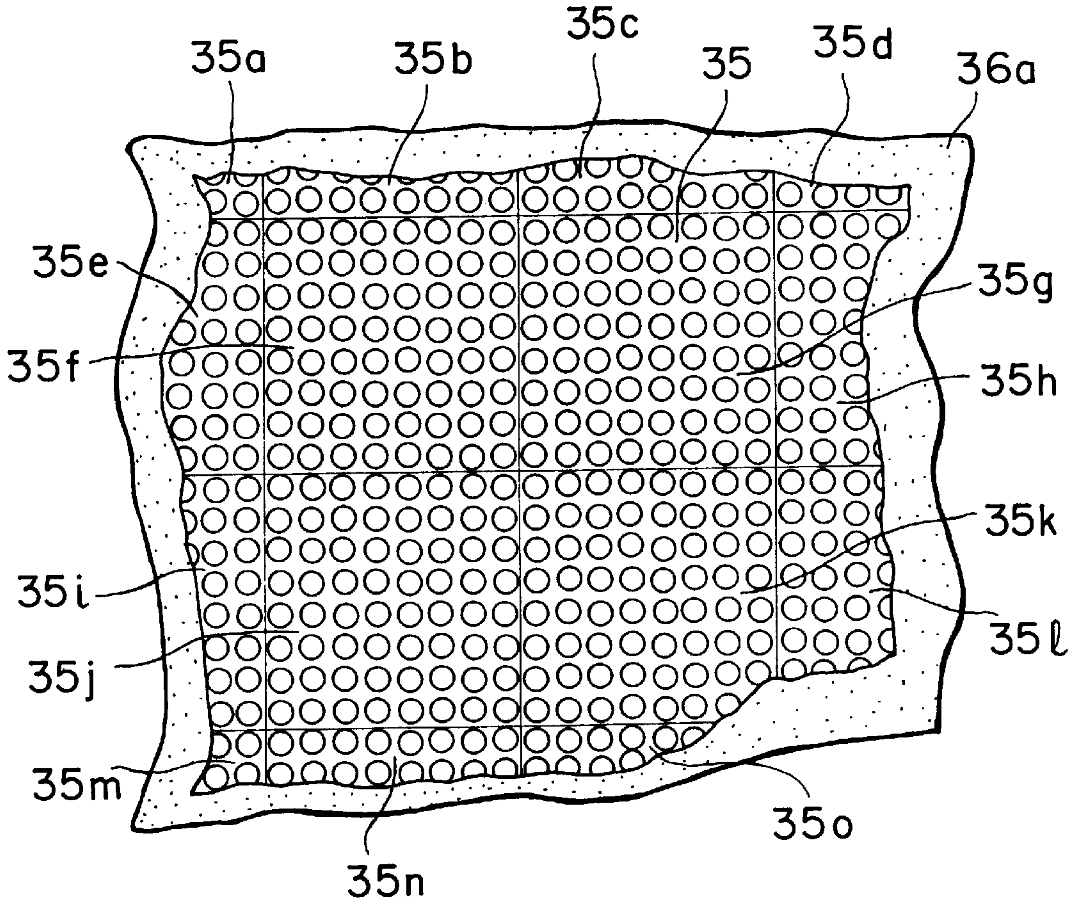
FIG. 21 is a front view of a seventh embodiment according to the present invention.

Referring to FIG. 21, a seventh embodiment of the present invention is described. In this embodiment, surface luminous plates 35*a* to 35*o* are combined and arranged in a plane on the transparent planar plate 36*a* in accordance with the size of the colored transparent pattern 41 as a luminous plate having a sheetlike EL element 42 or a high-luminous reentrant-reflective sheet 38 and the surface luminous plates 35, 35*a*, . . . *o*. When a high-luminous-pattern display apparatus is made in conformity with the size of a pattern, this combination is absolutely necessary.

Figure 22:
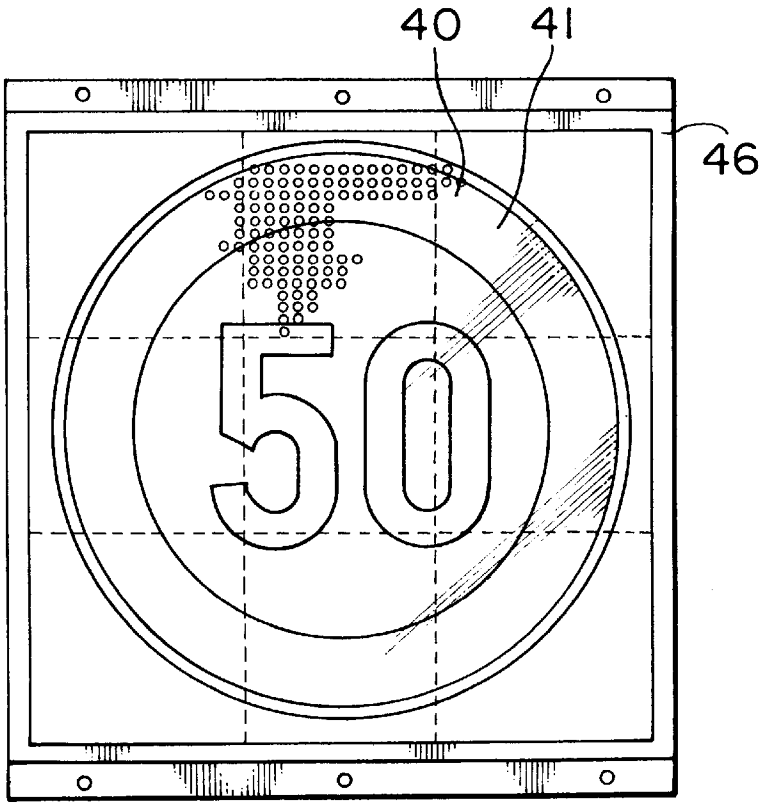
FIG. 22 is a front view showing that a high-luminous display apparatus according to the present invention made by molding a transparent planar plate integrally with planoconvex lenses is applied in a traffic sign.
Figure 23:
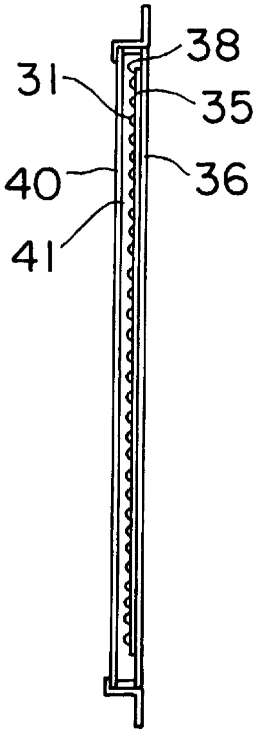
FIG. 23 is a side view of FIG. 22.
Figure 24:
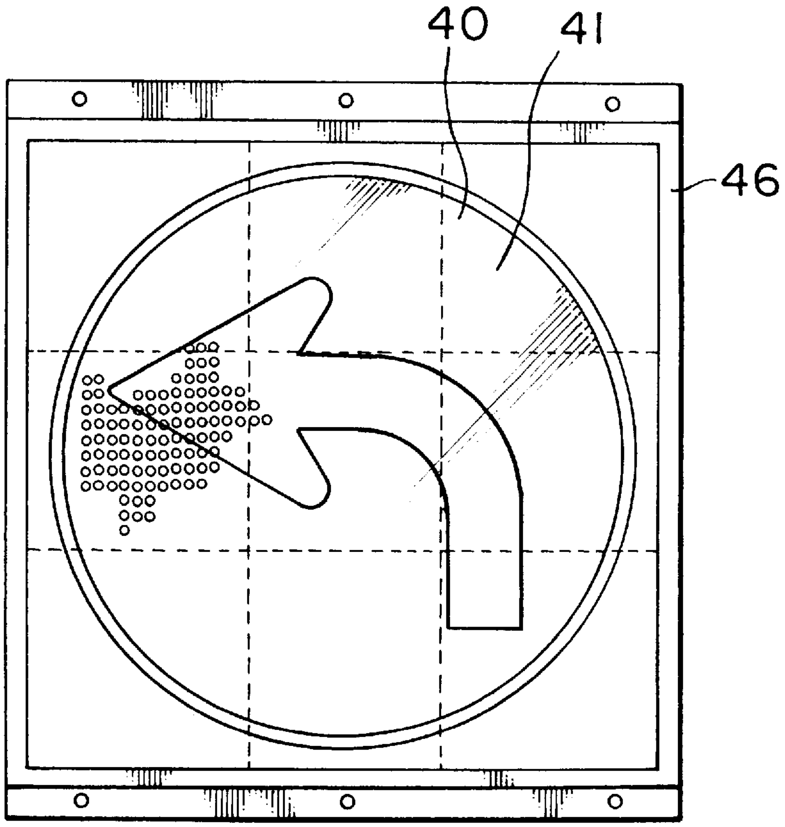
FIG. 24 is a front view showing a high-luminous display apparatus according to the present invention like that of FIG. 22, with the pattern changed.

FIGS. 22 to 24 show cases wherein the present high-luminous-pattern display apparatus is applied to traffic signs. FIG. 23 is a sectional side view, showing that 9 surface luminous plates 35 as shown above are combined and arranged in a plane in a housing frame 46. FIG. 24 shows that the colored transparent pattern 41 shown on the transparent surface plate 40 is changed. By replacing only the transparent display plate 40 with other transparent display plates with the pattern 41 changed and incorporating the other transparent display plates into the above housing frame 46, high-luminous-pattern display apparatuses can be made as many types of traffic signs.

Figure 25:
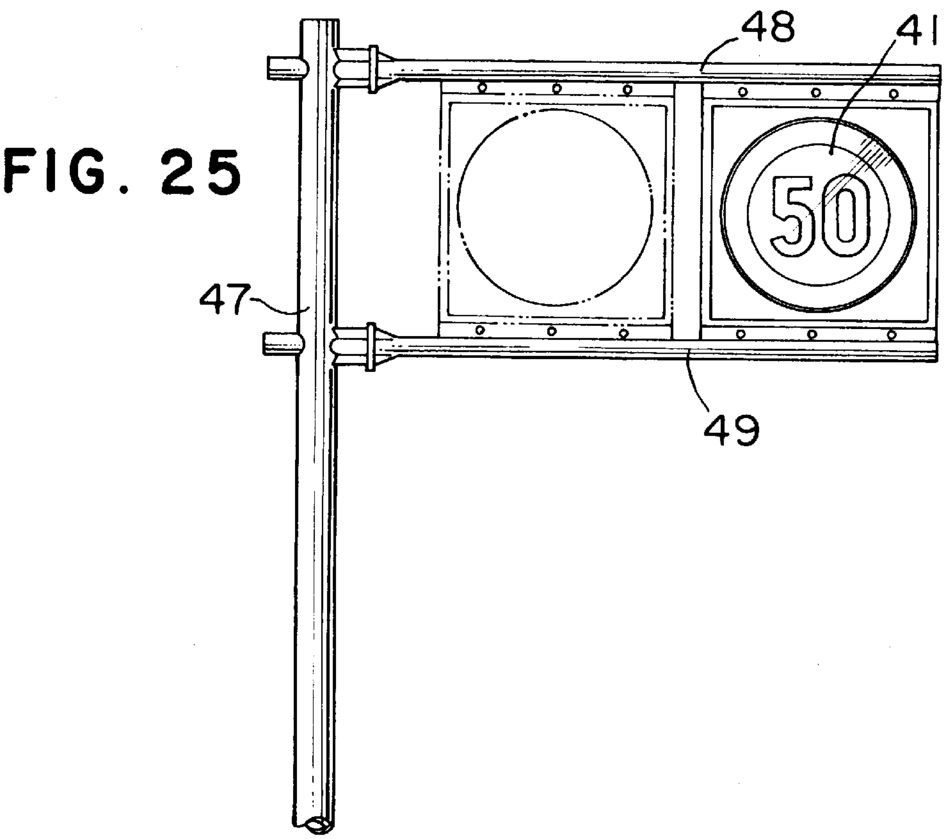
FIG. 25 is a front view of the traffic sign of FIG. 22 which is attached to an arm provided to a support.
Figure 26:
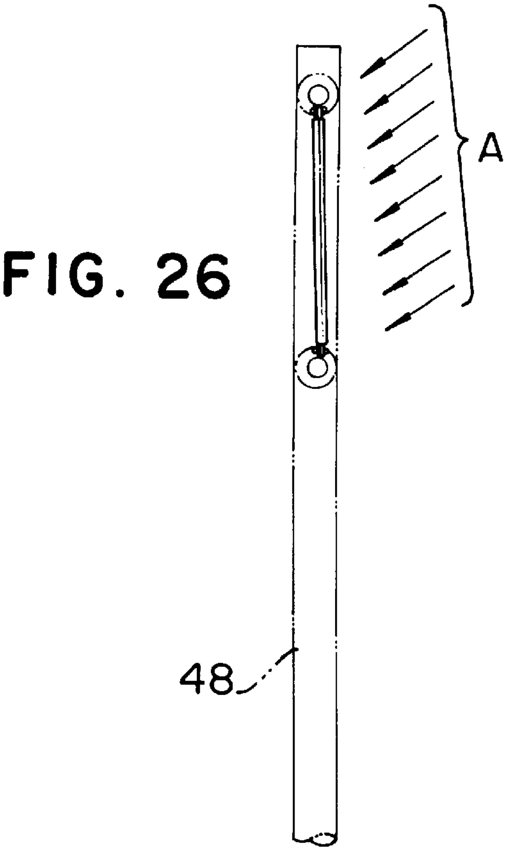
FIG. 26 is a side view of FIG. 25.
Figure 27:
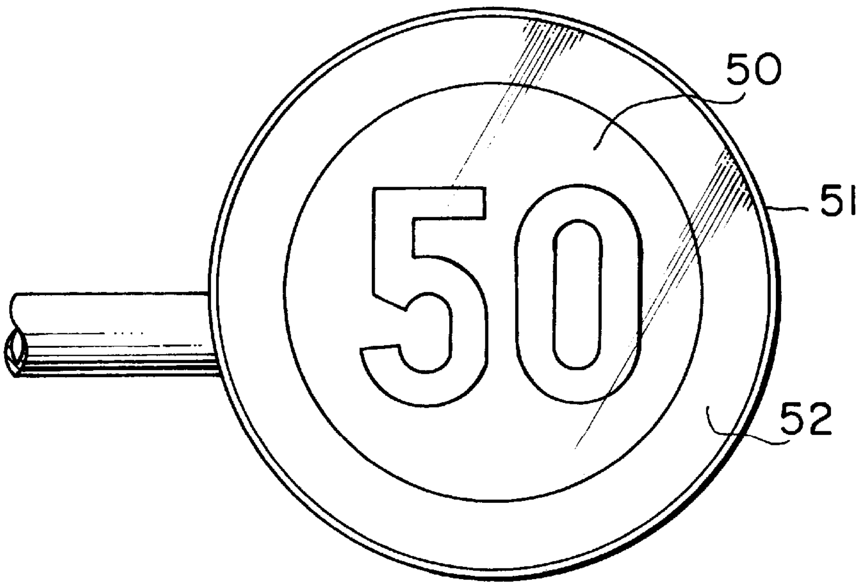
FIG. 27 PRIOR ART
FIG. 27 is a front view of a conventional traffic sign.
Figure 28:
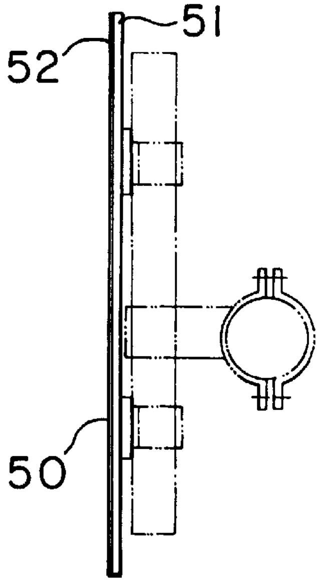
FIG. 28 PRIOR ART
FIG. 28 is a side view of the conventional traffic sign.
Figure 29:
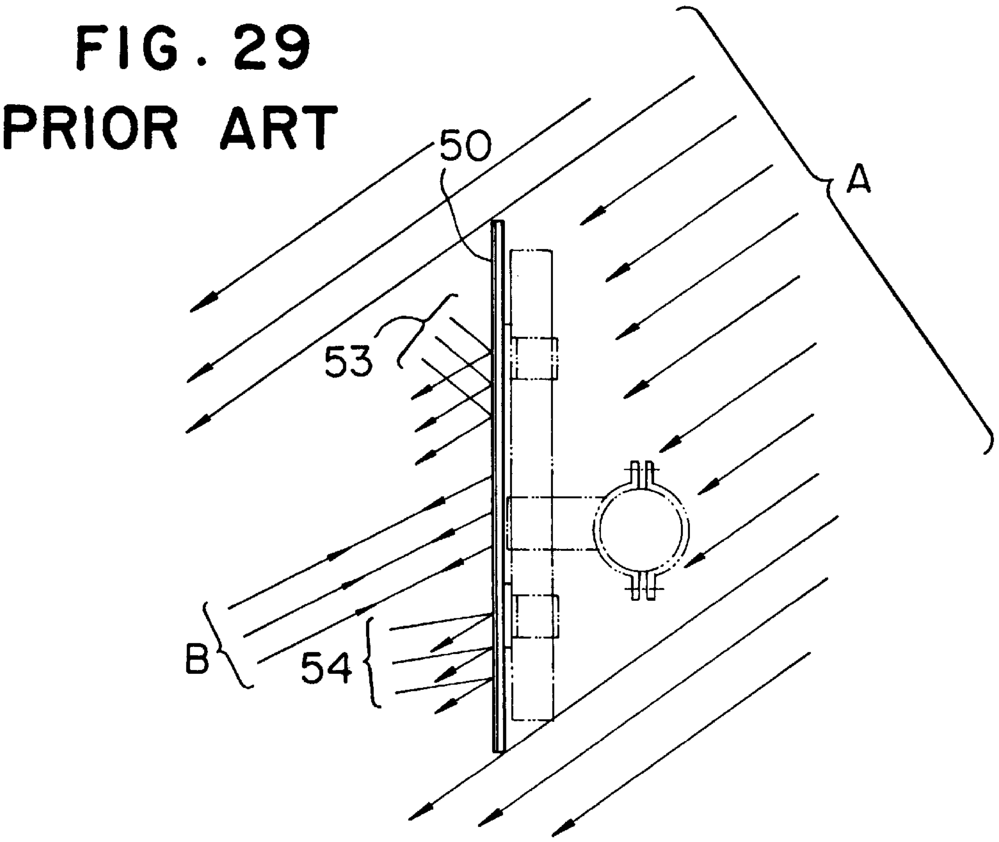
FIG. 29 PRIOR ART
FIG. 29 is a view illustrating the action of the conventional traffic sign.
Figure 30:
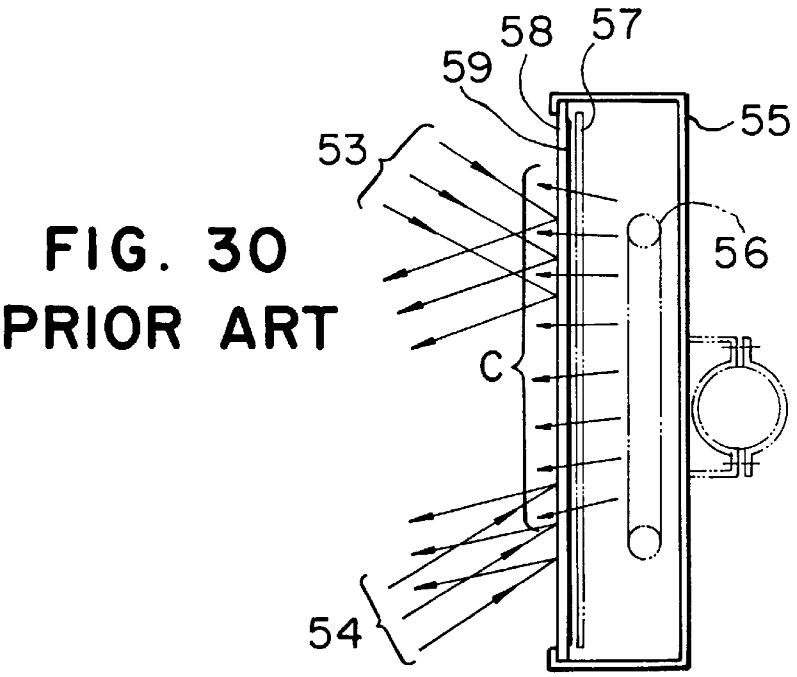
FIG. 30 PRIOR ART
FIG. 30 is a sectional side view showing the structure of the conventional internally illuminated sign.

FIG. 25 is a front view of the high-luminous-pattern display apparatuses as traffic signs shown in FIGS. 22 and 24 that are attached between arms 48 and 49 provided to a support 47. FIG. 26 is a side view of the high-luminous-pattern display apparatus of FIG. 25, which can display highly brightly luminously the colored transparent pattern 41 by the direct sunlight and in-air diffused light A.

What is claimed is:

1. A high-luminous-pattern display apparatus comprising a surface luminous plate, said surface luminous plate comprising a transparent planar plate stood vertically to a horizontal direction, said transparent planar plate having a front surface and an opposite rear surface, said rear surface being a light incident surface on which direct sunlight and in-air diffused light falls, said surface luminous plate further comprising a group of spaced transparent planoconvex lenses arranged uniformly in spaced columns and rows and integrally molded with said front surface of said transparent planar plate, said rear surface of said transparent planar plate having a planar section in the spaces between the rows and columns of said spaced planoconvex lenses, and reflective prisms integrally molded with said planar section of said rear surface of said transparent planar plate, said columns and rows of planoconvex lenses defining a front surface of the surface luminous plate, and a planar display plate having a pattern and arranged at said front surface of said surface luminous plate.

* * * * *